United States Patent [19]

Messina et al.

[11] Patent Number: 4,459,147
[45] Date of Patent: Jul. 10, 1984

[54] PRESS HEAD FOR GLASSWARE FORMING MACHINE

[75] Inventors: Anthony Messina, Enfield; Francis A. Dahms, Tariffville, both of Conn.

[73] Assignee: Emhart Industries, Inc., Farmington, Conn.

[21] Appl. No.: 472,414

[22] Filed: Mar. 4, 1983

[51] Int. Cl.³ .............................................. C03B 11/06
[52] U.S. Cl. ...................................... 65/322; 65/321; 65/362; 425/412
[58] Field of Search ................ 65/322, 321, 318, 309, 65/308, 362, 320, 330, 328, 247, 250, 257; 425/398, 412

[56] References Cited

U.S. PATENT DOCUMENTS

| | | | |
|---|---|---|---|
| 799,332 | 9/1905 | Hartman | 65/362 |
| 849,461 | 4/1907 | Conway | 65/309 |
| 943,858 | 12/1909 | Betz et al. | 65/318 |
| 1,177,613 | 4/1916 | Garwood et al. | 65/321 |
| 1,680,474 | 8/1928 | Peiler et al. | 65/318 |
| 2,113,956 | 4/1938 | Wadsworth | 65/330 |
| 2,570,817 | 10/1951 | Kinker | 65/322 |
| 4,339,264 | 7/1982 | Dahms | 65/241 |

Primary Examiner—S. Leon Bashore, Jr.
Assistant Examiner—Michael K. Boyer
Attorney, Agent, or Firm—Gene Warzecha

[57] ABSTRACT

An adjusting mechanism is disclosed for the press head of a glassware forming machine of the rotating table type having a plurality of forming units circumferentially spaced for rotation about the axis of the machine. Adjustment is effected by rotating a parallel adjusting rod, which is engaged to a threaded rod. Rotation varies the pressure of the plunger by changing the position of a pinion on the threaded rod, through spring compression or pinion gear rotation, to which the stop lever on the plunger steam will contact. Each forming unit is capable of producing at least two glassware articles per machine cycle. A remote ram spring adjustment means provides operator control of ram spring pressure for each plunger at an accessable height and location.

3 Claims, 3 Drawing Figures

PRESS HEAD FOR GLASSWARE FORMING MACHINE

BACKGROUND OF THE INVENTION

1. Field of the Invention

The invention relates generally to glassware forming machine of the rotating table type having a plurality of continuously rotating, circumferentially spaced forming units. More particularly, the invention relates to a press head adjustment mechanism for adjusting the pressing pressure of the plungers associated with the press head of each forming unit of the machine.

2. Description of the Prior Art

Glassware forming machines of the rotating table type are well known in the glassware manufacturing industry. One type of such machine is shown in U.S. Pat. No. 1,979,211 and is commonly referred to as the "Emhart H-28 Machine." This type of machine is a single table, continuous rotary motion machine having a plurality of individual forming units mounted for rotation about the axis of the machine. These machines have been available with different numbers of individual forming units, thus constituting, for example, a 6, 12 or 18 section machine. In such H-28 machines each individual forming unit produces one glassware article for each complete revolution or cycle of the machine and will therefore be referred to herein as H-28 single gob machines.

A significant improvement over the H-28 single gob machine is disclosed in U.S. Pat. No. 4,339,264 which describes an H-28 double gob machine where each individual forming unit produces two glassware articles for each complete cycle. This patent is hereby incorporated by reference in this disclosure in its entirety.

The prior art H-28 double gob machine has a ram spring pressure or pre-load adjustment associated with each plunger and a means for total pressing pressure adjustment with each plunger. Each of these adjustment mechanisms is similar to corresponding mechanisms in the H-28 single gob machine.

These adjustments are necessary to compensate for variations in gob weight or viscosity and are generally achieved by adjustment of the ram spring. When the plunger starts to contact the gob in the bottom of the blank mold, glass starts to flow around the plunger and to a certain extent resists its further downward motion. At some point the gob starts to lift the plunger thereby compressing the associated ram spring even though the press head continues to move downwardly. When the ram spring is compressing it forces the plunger into glass in the blank mold causing the molten glass to flow around the plunger. The force with which the plunger initially contacts the gob is determined by the ram spring pre-load adjustment.

Basically, the plunger pressing pressure is accomplished in prior art H-28 single and double gob machines through the use of nuts and stop nuts which alter the pre-load of the ram spring. Both sets of nuts and stop nuts are threadably engaged on opposite end of threaded rods parallel to and offset from the plunger stem. Because of the complexity of parts associated with the prior art H-28 double gob machine and its considerably greater height compared to the H-28 single gob machine it was found that the single gob ram spring adjustment method was inappropriate for the double gob configuration. Accordingly, one object of this invention is to provide a ram spring adjustment mechanism facilitating the operator's adjustment of ram spring forces. Another object of this invention is to provide a ram spring adjustment mechanism at a convenient, accessable height for the operator.

SUMMARY OF THE INVENTION

These and other objects of the invention are accomplished by the preferred embodiment which comprises a remote ram spring adjustment mechanism. A pair of adjusting rods is situated parallel to the threaded rods of the press head. Each of the threaded rods is provided with a threaded gear resting against the top of the ram spring coaxially mounted on the threaded rod, each of these gears being in meshed en-gagement with a corresponding pinion secured to the adjusting shaft. Rotation of the adjusting shaft by means of a handle secured to its lower end at a height accessable to the operator produces a corresponding rotation of the gear and consequent pressure adjustment by changing the position of the upper end of the ram spring relative to the lower end.

The stop lever pinned to each of the plunger stems is, in a rest position, held between the lower end of the ram spring and the upper surface of a pinion threadably engaged on a corresponding threaded rod. Rotation of this pinion is effected through rotation of a corresponding adjusting gear coaxially situated on a corresponding adjusting rod thereby causing pivotable motion of the stop lever and consequent adjustment of the plunger height relative to the press head.

The pinion adjusting mechanism as well as the ram spring adjustment mechanism are each provided with a clamp means for locking the adjusting components in a desired position.

DESCRIPTION OF THE PREFERRED EMBODIMENT

Figure 1:
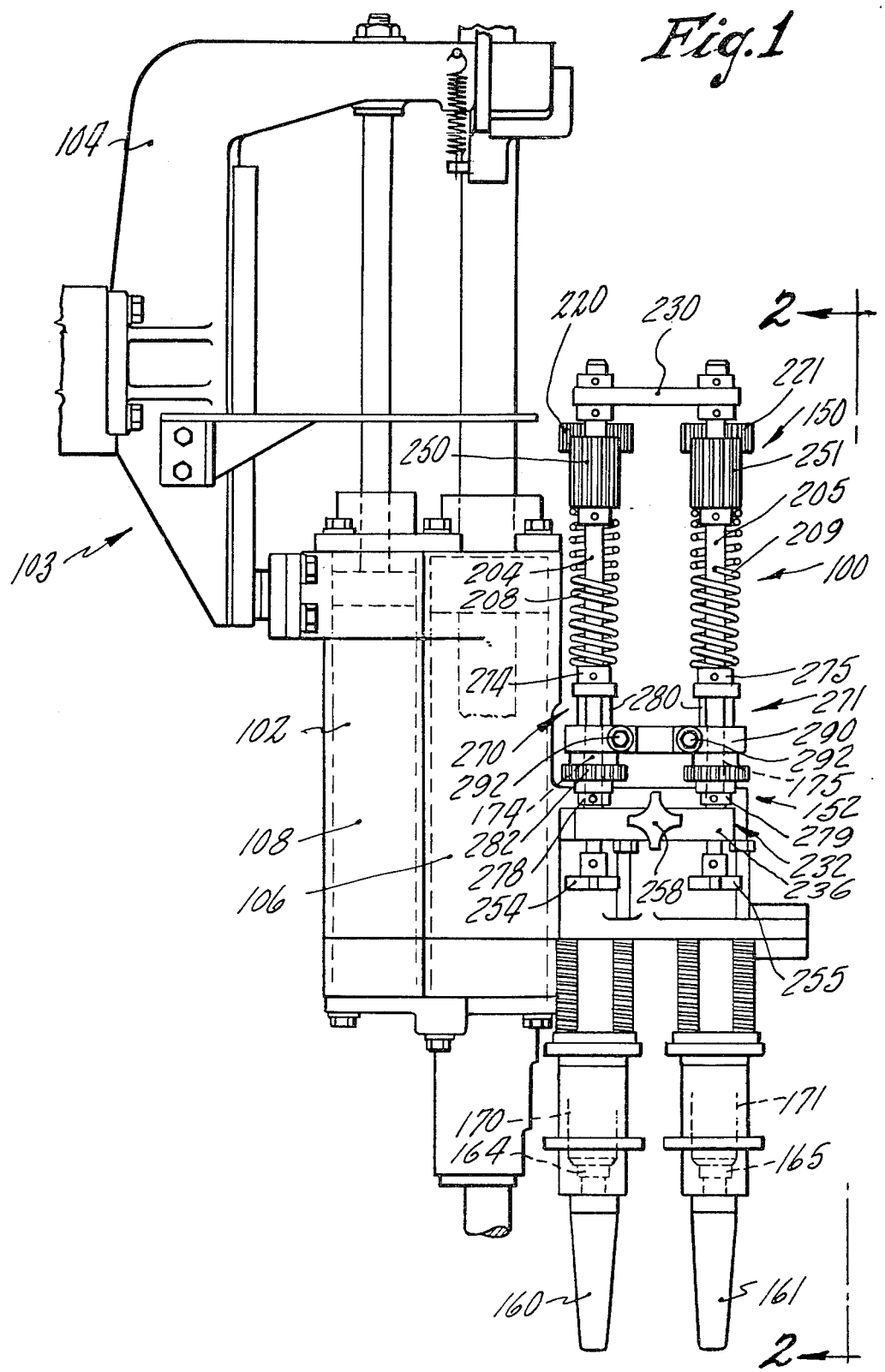
FIG. 1 is diagrammatic side elevational view of an improved press head constructed in accordance with the principles of this invention.

Referring now to FIG. 1 there is shown a side elevational view of an improved press head adjusting mechanism 100 constructed in accordance with the principles of this invention.

Adjusting mechanism 100 is affixed to the top of cylinder and plunger casting 102. It will be understood that a single casting and all associated components is provided on each forming unit of the machine, all of these components being generally termed the press head 103. Press head 103 is secured to a forming unit frame member 104 which is in turn affixed to other components of the machine (not shown) for rotation therewith. The general operation of the press head may best be understood by reference to the aforementioned U.S. Pat. No. 4,339,264.

The particular press head shown in FIG. 1 differs from the prior art press head in some respects. Cylinder casting 102 includes a main cylinder portion 106 and a booster cylinder portion 108 for providing additional pressing force. Furthermore, the plungers carried on the cylinder casting 102 are provided with adjustment mechanism 100.

Figure 2:
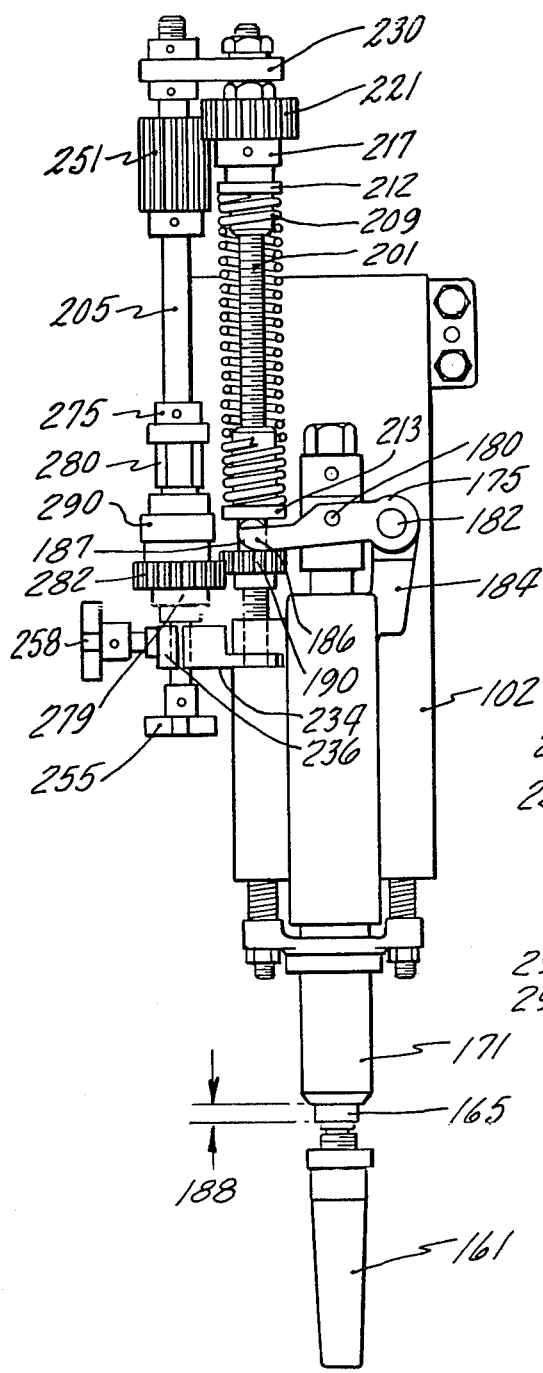
FIG. 2 is a front elevational view of figure one taken along the lines 2—2 with certain portions omitted for clarity.

Referring now to FIGS. 1 and 2 it is noted that adjustment mechanism 100 comprises a ram spring adjustment mechanism 150 and a plunger lever adjustment mechanism 152. Plungers 160 and 161 are secured in a conventional manner to plunger stems 164 and 165 respectively. Each plunger stem 164 and 165 passes through a rod sleeve 170 and 171, respectively, each of which in turn is secured within housing 102 to enable its respective plunger stem to pass therethrough. The other end of each stem 164 and 165 is provided with a stop lever 174 and 175, respectively. While the operation and structure of each stop lever is similar, only the details relating to stop lever 175 will be explained. As best seen in FIG. 2, stop lever 175 is pivotably pinned to plunger stem 165 by pin 180. One end of lever 175 is pivotably secured at fulcrum point 182 to bracket 184 which is fixedly connected to casting 102. The other end of lever 175 is a yoke-type structure having arms 186 and 187 slideably engaged about threaded rod 201.

The extent to which plunger 161 will be inserted into its corresponding blank mold (not shown) may be controlled by adjustment of the distance 188 by which plunger stem 165 extends below its sleeve 171. This distance 188 is a function of the position of stop lever 175 relative to fulcrum point 182 which position is controlled by stop pinion 190 which maintains contact with yoke arms 186 and 187 and may be adjusted as described below.

Each plunger and corresponding plunger stem has associated with it a parallel and laterally offset threaded adjustment rod 200 and 201, respectively. Each threaded rod 200 and 201 in turn has a parallel adjusting rod 204 and 205 associated with it.

Each threaded rod 200 and 201 is provided with a coaxial ram spring 208 and 209, respectively. Each ram spring is situated on its respective threaded rod between an upper collar 212 and a lower collar 213 (best seen in FIG. 2), both collars being slideably mounted on their respective threaded rods. The bottom surface of collar 213 is, by the force of the associated ram spring 209, pressed against yoke arms 186 and 187 of stop lever 175. The upper surface of collar 212 is similarly pressed via thrust bearing 217 against the lower surface of internally threaded gear 221. It should be noted that when the press head is not pressing the plunger into glass the stop lever arms 186 and 187 will be squeezed between the lower end of ram spring 209 and the upper surface of pinion 190.

Adjusting rods 204 and 205 are situated parallel to their corresponding threaded rods 200 and 201, respectively, and between upper mounting plate 230 and lower mounting assembly 232. Upper plate 230 is provided with a plurality of apertures for receiving the ends of threaded rods 200 and 201 and adjusting 204 and 205 which are secured to plate 230 by conventional means. Mounting assembly 232 includes a mounting bar 234 secured to casting 102 and a clamp bar 236 explained below.

Each adjusting rod 204 and 205 is provided with a pinion 250 and 251, respectively, each of which is in threaded engagement with a corresponding gear 220 and 221. Each adjusting rod 204 and 205 is provided with an adjusting handle 254 and 255, respectively, at its lower end.

In operation, rotation of either handle 254 or 255 causes the corresponding pinions 250 or 251 to rotate associated gear 220 or 221 causing them to move along corresponding rods 200 or 201 thereby moving corresponding upper collar 212. This constitutes a ram spring compression adjustment since the lower collars 213 are not affected by rotation of handles 254 or 255.

The lower portion of each adjusting rod 204 and 205 is provided with a reduced diameter portion (best seen in FIG. 2) passing between clamp bar 236 and mounting block 234. Lock handle 258 threadably connects clamp bar 236 to mounting block 234 and thus provides a locking means to secure the position of adjusting rods 204 and 205.

Each adjusting rod 204 and 205 also serves as a pivot center for plunger lever adjustment means 270 and 271. Each adjustment means 270 and 271 is concentrically mounted to a corresponding one of shafts 204 and 205, respectively, and is axially secured thereto between upper retaining collars 274 and 275 and lower retaining collars 278 and 279. These collars permit independent rotation of adjustment means 270 and 271 relative to shafts 204 and 205 without affecting the ram spring compression adjustment.

Figure 3:
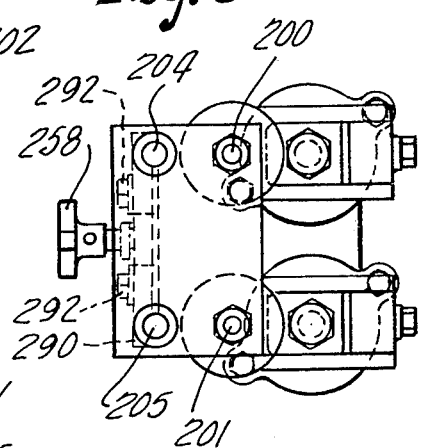
FIG. 3 is a plan view of FIG. 2 with certain portions omitted for clarity.

Each adjustment mechanism 270 and 271 is provided with a hexagonal adjusting nut 280 which is splined to a corresponding gear 282 which is in meshed engagement with a corresponding pinion 190. It is thus noted that rotation of hexagonal nut 280 causes rotation of a corresponding pinion 190. As best seen in FIG. 3, clamp bar 290 and clamp screws 292 enable a particular plunger lever adjustment to be locked in place. In operation, an operator would adjust the plunger lever by first loosening the appropriate clamp screw 292, then adjusting the associated hexagonal nut 280 and finally tightening corresponding clamp screw 292. All of these operations can be done manually with one hand unlike prior art plunger lever adjustments which required two hands.

Since yoke arms 186 and 187 are pressed between lower collar 213 and pinion 190 adjustment of the latter slightly affects the compression of the ram spring and therefor adjustment of the plunger lever may require readjustment of the ram spring compression.

It will be understood by those skilled in the art that numerous modifications and embodiments may be made to the invention disclosed herein without departing from the scope thereof.

What is claimed is:

1. In a glassware forming machine of the rotating table type having a plurality of forming units spaced about the periphery thereof for rotation therewith, each forming unit having a press head for pressing a plurality of plungers matingly into a corresponding plurality of blank molds of said machine, each of said plungers secured to one end of a plunger stem, a stop lever pivotably secured to the other end of each of said plunger stems, each of said stop levers having a first end pivotably secured to said press head and a second forked end in slidable engagement with a corresponding threaded rod, each of said threaded rods parallel to and laterally spaced from corresponding ones of said plunger stems, an apparatus for adjusting the initial pressure of each plunger comprising:

a plurality of adjusting shafts, each parallel to a corresponding one of said threaded rods;

a plurality of gears, each slidably secured to a respective one of said adjusting shafts for rotation independently thereof;

a plurality of internally threaded pinions each in threadable engagement with a corresponding one of said threaded rods and in meshed engagement with a corresponding one of said plurality of gears, each of said pinions for contacting said forked end of a corresponding stop lever;

means for rotating each of said plurality of gears independently of the other to thereby rotate the corresponding one of said pinions.

2. In a glassware forming machine of the rotating table type having a plurality of forming units spaced about the periphery thereof for rotation therewith, each forming unit having a press head for pressing a plurality of plungers mateingly into a corresponding plurality of blank molds of said machine, each of said plungers secured to one end of a plunger stem, a corresponding threaded rod, parallel to and laterally spaced from corresponding ones of said plunger stems, each of said threaded rods having a concentric ram spring thereon, an apparatus for adjusting the pressure of each of said ram spring comprising:

a plurality of adjusting rods parallel to each of said threaded rods;

a gear threadably engaged with each of said threaded rods, one surface of each of said gears in communicating engagement with one end of a respective one of said ram springs;

a pinion secured to each of said adjusting rods for being in meshed engagement with a corresponding one of said gears;

means for rotating each of said adjusting rods whereby, upon rotation of each of said adjusting rods the corresponding one of said pinions will cause the corresponding one of said gears to threadably move along said threaded rod and thereby adjust the length of the corresponding one of said ram spring.

3. An apparatus according to claim 1 or 2 further comprising:

means for locking each of said means for rotating in a desired position.

* * * * *